(12) United States Patent
Chalil et al.

(10) Patent No.: US 8,941,674 B2
(45) Date of Patent: Jan. 27, 2015

(54) SYSTEM AND METHOD FOR EFFICIENT RESOURCE MANAGEMENT OF A SIGNAL FLOW PROGRAMMED DIGITAL SIGNAL PROCESSOR CODE

(71) Applicant: Analog Devices, Inc., Norwood, MA (US)

(72) Inventors: Mohammed Chalil, Bangalore (IN); John Joseph, Kerala (IN)

(73) Assignee: Analog Devices, Inc., Norwod, MA (US)

( * ) Notice: Subject to any disclaimer, the term of this patent is extended or adjusted under 35 U.S.C. 154(b) by 148 days.

(21) Appl. No.: 13/691,670

(22) Filed: Nov. 30, 2012

(65) Prior Publication Data

US 2014/0152680 A1 Jun. 5, 2014

(51) Int. Cl.
*G06T 1/60* (2006.01)
*H04N 9/64* (2006.01)
*G06K 15/00* (2006.01)
*G06K 9/54* (2006.01)
*G06K 9/60* (2006.01)
*G06F 13/00* (2006.01)
*G06F 13/28* (2006.01)
*G06F 12/02* (2006.01)
*G06F 9/50* (2006.01)

(52) U.S. Cl.
CPC . *G06T 1/60* (2013.01); *G06F 12/02* (2013.01); *G06F 9/5016* (2013.01)
USPC .......... 345/530; 348/714; 358/1.16; 382/305; 711/100

(58) Field of Classification Search
CPC ............ G06F 11/3409; G06F 11/3466; G06F 11/0709; G06F 2212/1036; G06F 3/064; G06F 9/544; G06F 11/3433; G06F 8/20; G06F 9/5016; G06F 3/0631; G06F 13/00; G06F 13/1668

USPC .......... 345/530; 348/714; 358/1.16; 382/305; 711/100
See application file for complete search history.

(56) References Cited

U.S. PATENT DOCUMENTS

| 8,681,166 B1 | 3/2014 | Chalil et al. |
| 8,711,160 B1 | 4/2014 | Chalil et al. |
| 2005/0097140 A1 | 5/2005 | Jarl |

OTHER PUBLICATIONS

USPTO Apr. 26, 2013 Non-Final Office Action from U.S. Appl. No. 13/691,684, 2013.
Marchal, P., et al., "SDRAM-Energy-Aware Memory Allocation for Dynamic Multi-Media Applications on Multi-Processor Platforms," Proceeding of the Design, Automation and Test in Europe Conference and Exhibition (DATE'03), pp. 1-6, 2003.

(Continued)

*Primary Examiner* — Kee M Tung
*Assistant Examiner* — Haixia Du
(74) *Attorney, Agent, or Firm* — Patent Capital Group

(57) ABSTRACT

A method according to an embodiment of a system for efficient resource management of a signal flow programmed digital signal processor code is provided and includes determining a connection sequence of a plurality of algorithm elements in a schematic of a signal flow for an electronic circuit, the connection sequence indicating connections between the algorithm elements and a sequence of processing the algorithm elements according to the connections, determining a buffer sequence indicating an order of using the plurality of memory buffers to process the plurality of algorithm elements according to the connection sequence, and reusing at least some of the plurality of memory buffers according to the buffer sequence.

20 Claims, 9 Drawing Sheets

(56) References Cited

OTHER PUBLICATIONS

Oh, Hyunok, et al., "Data Memory Minimization by Sharing Large Size Buffers," Design Automation Conference, 2000, pp. 491-496.

U.S. Appl. No. 13/691,684, filed Nov. 30, 2012, entitled "System and Method for Efficient Resource Management of a Signal Flow Programmed Digital Signal Processor Code," Inventor(s) Mohammed Chalil, et al.

U.S. Appl. No. 13/691,696, filed Nov. 30, 2012, entitled "System and Method for Efficient Resource Management of a Signal Flow Programmed Digital Signal Processor Code," Inventor(s) Mohammed Chalil, et al.

Altera Corporation, "24. DMA Controller Core," *Quartus II Handbook Version 9.1, vol. 5: Embedded Peripherals,* ©Nov. 2009 Altera Corporation. 10 pages.

"EE-66 Engineer-to-Engineer Note," Analog Devices, Inc, [retrieved and printed Nov. 29, 2012] http://www.analog.com/static/imported-files/application_notes/EE-66.pdf; 38 pages.

Girbal, Sylvain, et al., "A Memory Interface for Multi-Purpose Multi-Stream Accelerators," *Cases '10 Proceedings of the 2010 international conference on Compilers, architectures and synthesis for embedded systems,* Oct. 24-29, 2010, pp. 107-116, ©2010 ACM 978-1-60558-903—Sep. 10, 2010; 9 pages.

Hyperception, Inc., "Building DSP Applications via Graphical Design—"Does a picture 'cost' a thousand words? ©Hyperception, Inc., 2001 All Rights Reserved Worldwide; 30 pages.

Lyons, Michael J., et al., "The Accelerator Store Framework for High-performance, Low-power Accelerator-Based Systems," *IEEE Computer Architecture Letters,* Jul.-Dec. 2010 Issue, 4 pages.

Panda, Preeti Ranjan, et al., "*On-Chip vs. Off-Chip Memory*: The Data Partitioning Problem in Embedded Processor-Based Systems," *ACM Transactions on Design Automation of Electronic Systems,* vol. 5, No. 3, Jul. 2000, pp. 682-704. ©2000 Acm 10844309/00/0070-0682; 23 pages.

Powersoft *SigmaStudio User Guide,* ©2011 Powersoft, 19 pages.

"Sigmastudio Graphical Development Tool," Analog Devices, Inc., [retrieved and printed on Feb. 8, 2012] http://222.analog.com/en/processorsdsp/sigmadsp/products/CU_over_SigmaStudio_graphical_dev_tool_overview/fca.html; 2 pages.

Final Office Action for U.S. Appl. 13/691,684 mailed Sep. 6, 2013, 27 pages.

Notice of Allowance for U.S. Appl. 13/691,684 mailed Nov. 22, 2013, 19 pages.

Non-Final Office Action for U.S. Appl. No. 13/691,696 dated May 22, 2013, 39 pages.

Final Office Action for U.S. Appl. No. 13/691,696 mailed Sep. 6, 2013, 35 pages.

Notice of Allowance for U.S. Appl. No. 13/691,696 mailed Dec. 13, 2013, 18 pages.

Edward Ashford Lee et al., "Static Scheduling of Synchronous Data Flow Programs for Digital Signal Processing," IEEE Transactions on Computers, vol. C-36, No. 1, Jan. 1987, pp. 24-35.

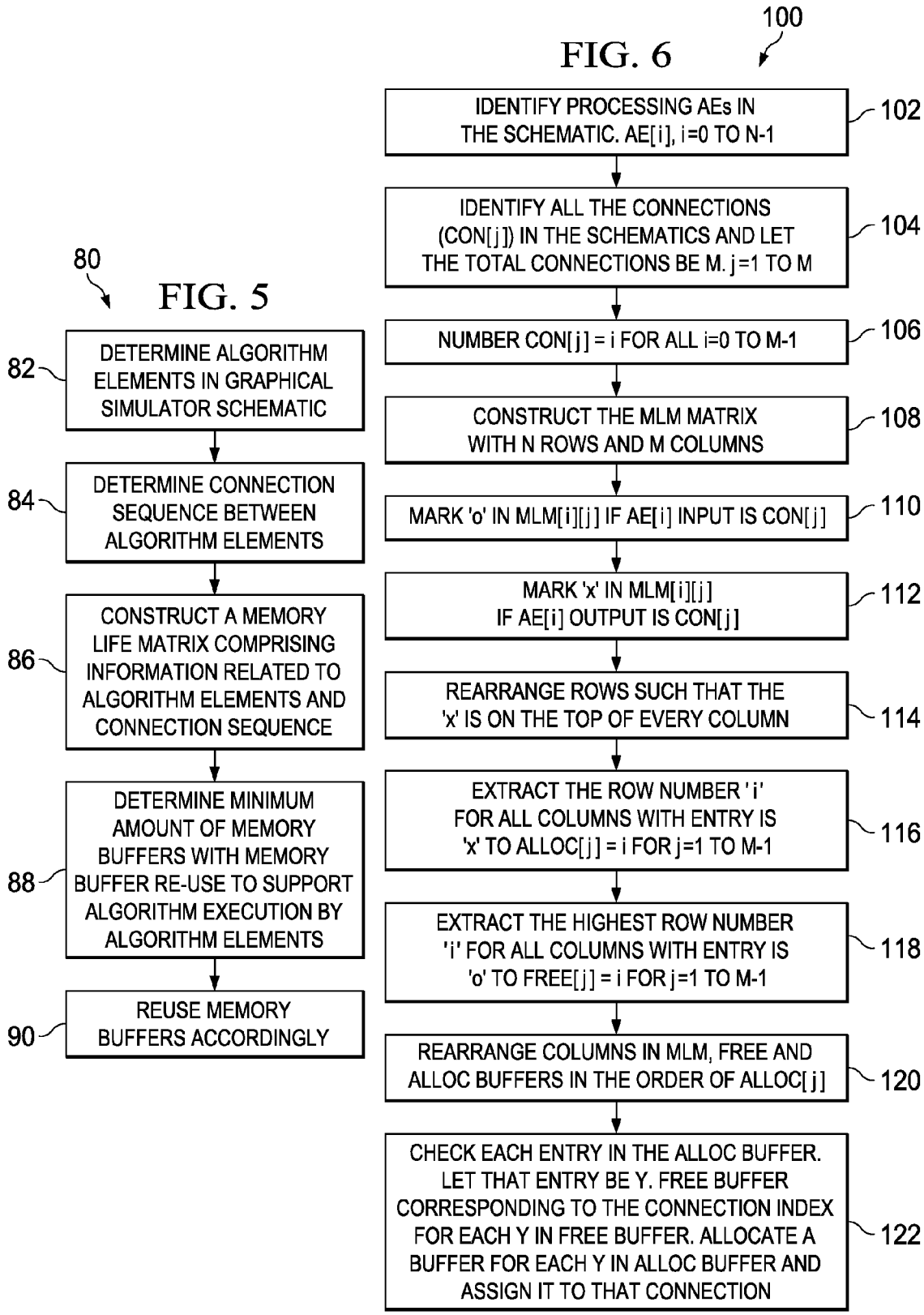

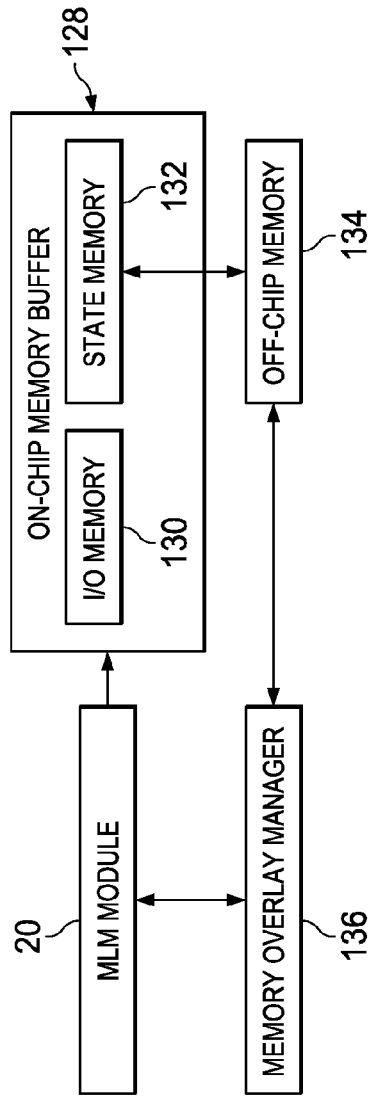

|  | stat1 | stat2 | stat3 | stat4 | stat5 | ⋯ |
|---|---|---|---|---|---|---|
| S1 |  |  |  |  |  |  |
| S2 |  |  |  |  |  |  |
| S3 |  |  |  |  |  |  |
| D2i | ///// | ///// | ///// | ///// | x ///// | ///// |
| S6 |  |  |  |  |  |  |
| S7 |  |  |  |  |  |  |
| S5 |  |  |  |  | o |  |
| D2o | ///// | ///// | ///// | ///// | s ///// | ///// |
| S4 |  |  |  |  |  |  |
| S8 |  |  |  |  |  |  |

1. S5 OFFLOADS P5 MIPS TO OFFLOADER AND OH5 IS THE OFFLOADING DMA OVERHEAD
2. THE BANDWIDTH FOR P5+OH5 < THE PROCESSING TIME OF S6+S7
3. POSITION D2i TO LOAD THE BUFFER FROM THE INTERFACE INPUT BUFFER TO THE OFF-LOADER, SUCH THAT STATE MEMORY CAN BE AVAILABLE FOR PROCESSING
4. POSITION D2o TO READ THE RESULT BUFFER FROM THE OFFLOADER TO THE INTERFACE OUTPUT BUFFER S5

FIG. 12

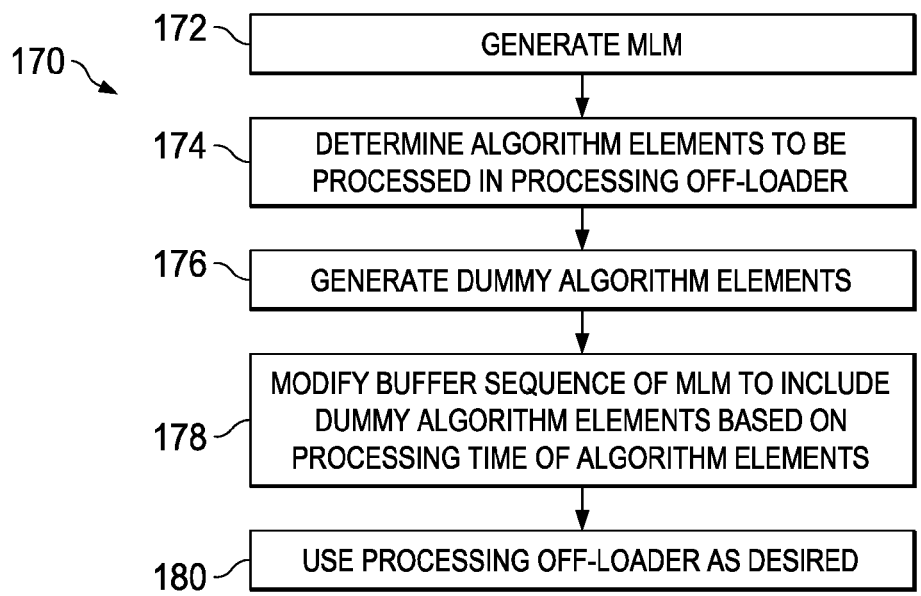

FIG. 13

SYSTEM AND METHOD FOR EFFICIENT RESOURCE MANAGEMENT OF A SIGNAL FLOW PROGRAMMED DIGITAL SIGNAL PROCESSOR CODE

TECHNICAL FIELD

This disclosure relates in general to the field of digital processing systems and, more particularly, to a system and method for efficient resource management of a signal flow programmed digital signal processor code.

BACKGROUND

Signal processing deals with operations on or analysis of measurements of time-varying or spatially varying signals (e.g., sound, images, and sensor data, for example biological data such as electrocardiograms, control system signals, telecommunication transmission signals, etc.) In particular, digital signal processing involves processing digitized discrete time sampled signals by general-purpose computers or by digital circuits such as application specific integrated circuits (ASICs), field-programmable gate arrays or specialized digital signal processors (DSPs). Arithmetic (e.g., fixed-point and floating-point, real-valued and complex-valued, multiplication and addition) and signal processing algorithms (e.g., Fast Fourier transform (FFT), finite impulse response (FIR) filter, Infinite impulse response (IIR) filter, etc.) may be implemented on the digitized discrete time sampled signals during the processing. Various tools, such as graphical programming tools, exist to facilitate appropriate processing of signals.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIG. 5 is a simplified flow diagram illustrating example operations that may be associated with an embodiment of the system;

FIG. 6 is a simplified flow diagram illustrating further example operations that may be associated with an embodiment of the system;

FIG. 7 is a simplified block diagram illustrating example details of the system in accordance with an embodiment;

FIG. 8 is a simplified diagram illustrating example details of the system according to the embodiment;

FIG. 12 is a simplified diagram illustrating further example details of the embodiment;

FIG. 13 is a simplified flow diagram illustrating example operations that may be associated with an embodiment of the system.

DETAILED DESCRIPTION OF EXAMPLE EMBODIMENTS

Overview

A method according to an embodiment of a system for efficient resource management of a signal flow programmed digital signal processor code is provided and includes determining a connection sequence of a plurality of algorithm elements in a schematic of a signal flow for an electronic circuit, the connection sequence indicating connections between the algorithm elements and a sequence of processing the algorithm elements according to the connections, determining a buffer sequence indicating an order of using a plurality of memory buffers to process the plurality of algorithm elements according to the connection sequence, and reusing at least some of the plurality of memory buffers according to the buffer sequence.

In specific embodiments, determining the buffer sequence includes numbering the connections, the algorithm elements and the memory buffers in an order. For each connection, a first algorithm element that generates an output on the connection before any other algorithm element may be identified. A second algorithm element that receives the output as an input on the connection after all other algorithm elements may also be identified. The first algorithm elements of all the connections may be arranged in an allocation order including an ascending order of first algorithm element numbers. A buffer index for each connection may be generated according to the allocation order, the buffer index for the connection being the same as another buffer index for a re-use connection. The second algorithm element of the re-use connection may be the same as the first algorithm element of the connection. The buffer sequence may include the buffer index for all connections arranged according to the allocation order.

In various embodiments, determining the buffer sequence may include constructing a memory life matrix (MLM), including information about the algorithm elements and the connection sequence. In a specific embodiment, the MLM may include N rows, representing N algorithm elements, and M columns, representing M connections between the algorithm elements. The method may include other features in various embodiments.

Example Embodiments

Figure 1:
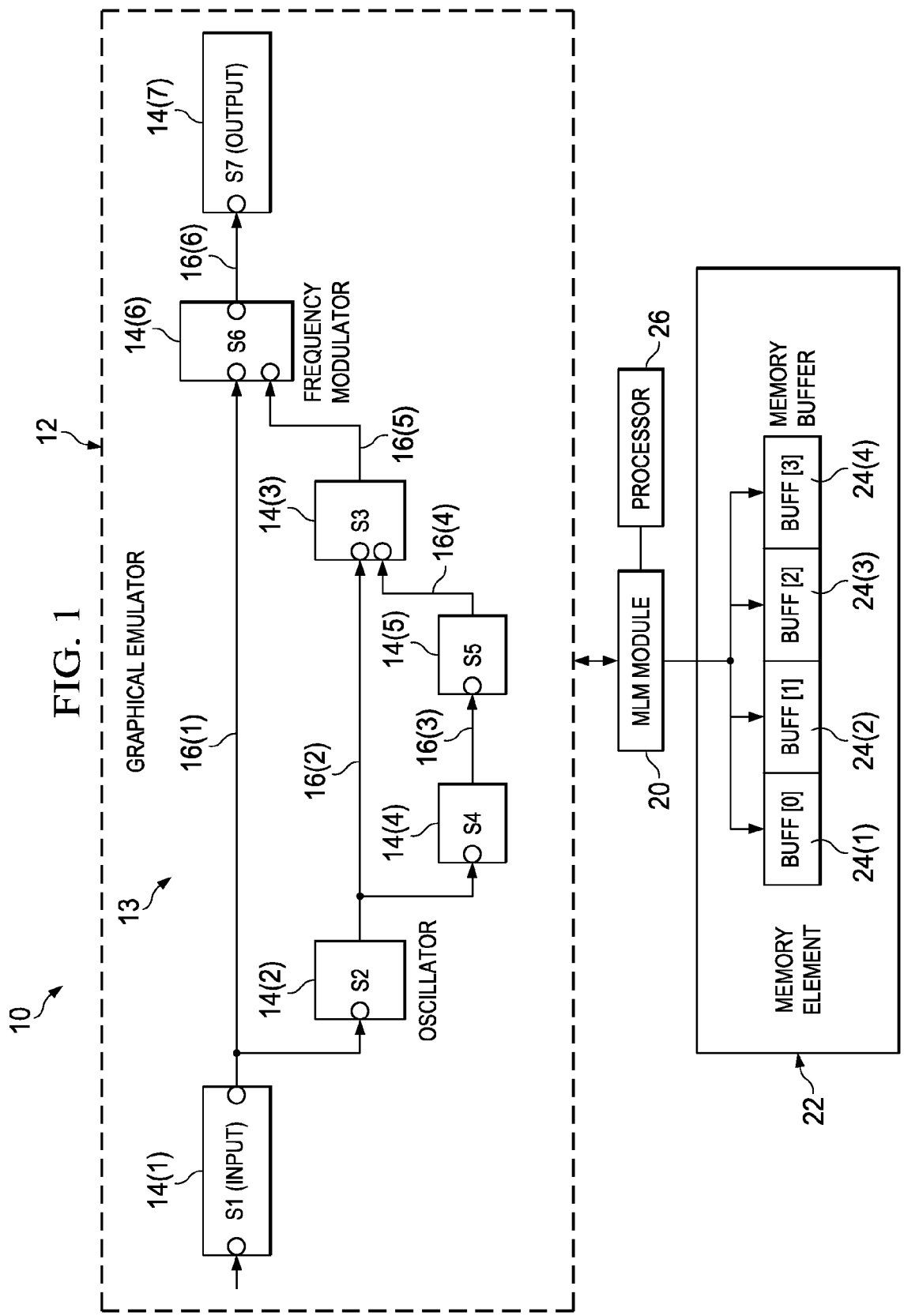
FIG. 1 is a simplified block diagram illustrating an example embodiment of a system for efficient resource management of a signal flow programmed digital signal processor code.

Turning to FIG. 1, FIG. 1 is a simplified block diagram illustrating a system 10. System 10 includes a graphical emulator 12 that can be used to design a signal flow and program it on an electronic circuit, such as a digital signal processor (DSP). An example schematic (e.g., graphical representation) 13 (generally indicated by an arrow) of a signal flow for an electronic circuit is displayed on graphical emulator 12. Schematic 13 includes one or more algorithm elements (AEs) 14(1)-14(7) (e.g., AE 14(1) (S1), AE 14(2) (S2) ... AE 14(7) (S7)). As used herein, the term "algorithm element" includes a component in a schematic of a signal flow for an electronic circuit. The component processes one or more input signals according to a predefined algorithm to provide one or more output signals. Each AE 14(1)-14(7) may represent an emulation (e.g., match; copy actions, functions, etc.; imitate; mimic; reproduce; etc.) of a functional electronic component, for example, an audio input, a filter, a dynamic processor, a frequency modulator, an oscillator, etc. configured to execute (e.g., process, implement, etc.) a specific algorithm. A user (e.g., DSP programmer, circuit designer, etc.) may generate schematic 13 manually on graphical emulator 12, for example, by building schematic 13 using available AEs and other graphical artifacts. The user can associate AEs 14(1)-14(7) with Signal Processing Algorithms (SPAs) pre-configured in graphical emulator 12, or generate custom SPAs as desired.

AEs 14(1)-14(7) may be connected with each other through connections 16(1)-16(6) to realize a specific signal processing algorithm (SPA). Connections 16(1)-16(6) may indicate inputs to and outputs from each AE 14(1)-14(7). Connections 16(1)-16(6) may represent a connection sequence (CS) that simulates signal flow through schematic 13. As used herein, the term "connection sequence" includes a sequence (e.g., order, progression, string, evolution, etc.) to process AEs in the schematic according to their corresponding connections. In the example schematic, AE 14(1) receives an input signal, processes it, and provides an output signal on connection 16(1). Output signal on connection 16(1) from AE 14(1) may be input to AEs 14(2) and 14(6).

When a connection is used by more than one AE, the value of the signal over the connection may be shared by both AEs during their respective processing. AEs 14(2) and 14(6) consequently cannot be processed until after AE 14(1) has been processed. The output signal on connection 16(2) from AE 14(2) may be input to AEs 14(3) and 14(4). AE 14(3) cannot be processed until after AEs 14(4) and 14(5) have been processed, as the output from AE 14(5) is an input to AE 14(3). The output signal on connection 16(3) from AE 14(4) may be input to AE 14(5). Output signal on connection 16(4) from AE 14(5) may be input to AE 14(3). AE 14(3) may generate an output signal on connection 16(5), which may be input to AE 14(6). The output signal on connection 16(6) from AE 14(6) may be input to AE 14(7), which may generate an output.

Graphical emulator 12 may communicate with a Memory Life Matrix (MLM) module 20. MLM module 20 may interact with a memory element 22, which can include one or more memory buffers 24 (e.g., buffers 24(1)-24(4)). Memory buffers 24(1)-24(4) may be used to store values of signals on connections 16(1)-16(6) during processing of AEs 14(1)-14(7). "Using" a memory buffer can include reading from the buffer, and/or writing to the buffer. MLM module 20 may also interact with a processor 26 as appropriate.

In various embodiments, MLM module 20 may facilitate emulating schematics (e.g., schematic 13) on graphical emulator 12 in a memory efficient manner. MLM module 20 may receive (from graphical emulator 12) information about connections 16(1)-16(6) and corresponding AEs 14(1)-14(7). The specific CS and memory requirements of AEs 14(1)-14(7) may be used by MLM module 20 to generate an optimum memory allocation scheme, for example, by re-using memory buffers 24(1)-24(4) for AEs 14(1)-14(7) and connections 16(1)-16(6) without affecting the functionality of the signal flow represented in graphical emulator 12. MLM module 20 may use buffers 24(1)-24(4) appropriately to reduce the amount of memory used by embodiments of system 10 during processing of AEs 14(1)-14(7).

Schematic 13 is an example, shown merely for ease of illustration, and is not a limitation. Virtually any number of AEs may be connected in any fashion to generate an appropriate schematic using graphical emulator 12. For example, the schematic may relate to part of an electronic circuit that performs Fast Fourier Transforms (FFTs), audio processing, such as volume control, toning, etc. associated with a programmable DSP. In a general sense, system 10 may be used to generate a target code for implementation on a DSP, such that signals input to the DSP are processed according to the SPA defined by system 10.

For purposes of illustrating the techniques of system 10, it is important to understand the operations of a given system such as the architecture shown in FIG. 1. The following foundational information may be viewed as a basis from which the present disclosure may be properly explained. Such information is offered earnestly for purposes of explanation only and, accordingly, should not be construed in any way to limit the broad scope of the present disclosure and its potential applications.

Graphical block diagram emulation tools with interactive plotting and visualization capabilities can accelerate DSP signal processing design. Several different methods can be used for graphical DSP programming, such as simulation and systems modeling; limited real-time development on a computer; simulation with subsequent source code generation and final cross-compilation to a DSP; and direct DSP object code generation. Some DSP programming methods use block diagrams for developing DSP applications. The block diagram design is implemented on a host computer and allows the designer to develop the DSP application with or without generating a DSP executable program.

Another method for developing a DSP application from a graphical approach is to use sound cards and video cameras that allow limited real-time DSP applications to be constructed and implemented on a computer. Yet another method for DSP programming via graphical means is to use a computer based block diagram, such as the example schematic of FIG. 1, to construct a DSP algorithm that executes on a host computer. After the DSP algorithm has been constructed and the simulation yields the desired results, the entire block diagram design can be used to generate a target code that implements the simulated design in a specific target (e.g., DSP).

An example graphical tool for DSP programming is Analog Device SigmaStudio™. The SigmaStudio graphical development tool can program, develop, and tune certain DSP software. For example, audio processing blocks can be wired together in a schematic, and the compiler can generate DSP-ready code and a control surface for setting and tuning parameters. SigmaStudio includes an extensive library of algorithms including basic low-level DSP functions and control blocks and advanced audio processing functions such as filtering, mixing, and dynamics processing. The AEs available for each processor are displayed in a 'ToolBox' and the AE can be dragged and dropped into the schematic. Each AE can contain one or more pins (e.g., input pin, output pin, control pint) to connect the AEs together. Output pins can connect to input pins and vice versa. Algorithms may be added to (e.g., associated with), or removed from (or de-associated from) AEs as appropriate. After the schematic is created, clicking a "compile" button can cause the tool to emulate the signal flow according the user input, and generate the target code.

Typically, the objective of SPA represented by the schematic using AEs and connections in a CS is to process a finite number of input channels to the various AEs to produce a finite number of output channels. The graphical tool captures the SPA as a signal flow. The complexity of the SPA that can be handled is typically limited by the resources of the target DSP on which the target code is to be run. For example, maximum memory, maximum Central Processing Unit (CPU) Million Instructions Per Second (MIPS) and maximum resource time of the target DSP may limit the maximum complexity that can be handled by a particular computing system.

For example, SigmaStudio uses a pointer based linking to manage memory requirements for processing the SPAs. In the pointer based linking scheme, the value of each signal is saved into a distinct memory buffer using a unique pointer. Buffers are used, in general, to pass data to and from processes and store information locally. The memory buffer's life cycle spans the time from when the buffer is created to when it is deleted. If schematic 13 of FIG. 1 were to be processed in such typical graphical tools, the value of input signal to AE 14(1) would be saved in a buffer Buff[0], which would be accessed via a pointer Ptr[0]. Graphical emulator 12 would process the input signal to AE 14(1) according to the associated algorithm, and write the value of the output signal on connection 16(1) into another buffer Buff[1], accessible via another pointer Ptr[1]. The value saved into Buff[1] would be used as input in the algorithm specified by AE 14(2), and the corresponding output signal on connection 16(2) would be written to yet another Buff[2], accessible via yet another pointer Ptr[2], and so on. Each signal would be associated with a unique buffer, accessible using a unique pointer.

In some graphical tool versions, the unique pointer may be derived from adding the size of each buffer successively to a BasePointer value. Thus, Ptr[0] may be the same as BasePointer; Ptr[1] may equal the sum of BasePointer and the size of Buff[0]; Ptr[2] may equal the sum of BasePointer, Buff[0] and Buff[1]; and so on. In some other graphical tool versions, an offset buffer may be additionally used, which can contain offsets to the actual buffer. Each offset obtained from the offset buffer is multiplied with the size of the buffer (BlockSize) to give the differential pointer to each buffer. The actual pointer can be obtained by adding the BasePointer to the resulting value.

In general, AE j may perform a predefined algorithm $A_j$ using $m_j$ inputs to produce $n_j$ outputs, consuming $p_j$ MIPS and engaging $r_j$ resources. Focusing on buffer memory alone, AE j can be represented as a function of $m_j$ and $n_j$ as $A_j(m_j, nj)$. Consider U=j=1: N, the set of all algorithms supported by system 10. A may represent a subset of U (A∪U) indicating the set of algorithms used by the specific schematic being analyzed. $A_j(m_j, n_j)$ indicates the instance of $A_j$ with $m_j$ inputs and $n_j$ outputs, with j=1:$N_j$, where $N_1 \leq N$ (the total number of available algorithms). Typical graphical tools execute all $A_j \in A$ in an order $Q_l$, the order being derived based on the schematic netlist (e.g., connectivity of the circuit design), where l=1:L (L≥1 when there can be one or more possible execution sequences). The total memory for output buffers $M_t$ may be obtained from the following equation.

$$M_t = Blocksize \times \sum_{j=1}^{N_1} n_j$$

In the signal flow programming environment, the CS information may be known apriori, before processing any AEs. The CS information and the details of all AEs in the schematic can be used to derive the memory resource readiness and life requirements of the SPA. Assume that maximum memory of the computing device (e.g., target DSP) processing the SPA is denoted by MaxMem, maximum CPU MIPS is denoted as MaxCpuMips, and maximum resource time is denoted as MaxResTime. Each AE j has a finite memory requirement called Element Memory requirement, denoted as EMem_j (e.g., under sub-categories such as state, scratch, Input-Output, external, internal etc.). Each AE j has a finite CPU load requirement denoted as ECpu_j. Each AE j has a finite resource requirement denoted as EResTime_j. The typical graphical tool can convert the signal flow into target code if and only if:

$$\sum_j EMem\_j \leq MaxMem$$

$$\sum_j ECpuMips\_j \leq MaxCpuMips$$

$$\sum_j EResTime\_j \leq MaxResTime$$

With complex schematics, and large number of AEs and signals, the memory size required for processing SPAs can increase to beyond the resource limitations of the computing device on which the graphic simulation is being executed.

System 10 is configured to address these issues (and others) in offering a more memory-efficient signal processing environment. In various embodiments, MLM module 20 may determine a sequence of operations such that memory buffers 24(1)-24(4) can be re-used for connections 16(1)-16(6), while keeping the memory size of buffers $M_{1t}$ much less than $M_t$ ($M_{1t} << M_t$):

$$M_{1t} = Blocksize \times \sum_{j=1}^{N_2} n_j$$

where $N_2$ is the maximum number of parallel elements (e.g., buffers used in parallel) and $N_2 << N_1$. In various embodiments, MLM module 20 may be applicable to scenarios involving external memory overlay, and/or load the task of accelerators and offloaders with Direct Memory Access (DMA) in the background.

Embodiments of system 10 may determine a connection sequence of a plurality of AEs (e.g., AEs 14(1)-14(7)) in a schematic (e.g., schematic 13) of an electronic circuit, where the connection sequence indicates connections between the algorithm elements and a sequence of processing the algorithm elements according to the connections. MLM module 20 may determine a buffer sequence. At least some of the plurality of memory buffers 24(1)-24(4) may be reused according to the buffer sequence. As used herein, the term "buffer sequence" includes an order of using the plurality of memory buffers (e.g., 24(1)-24(4)) to process the plurality of algorithm elements (e.g., AEs 14(1)-14(7)) according to the connection sequence. In various embodiments, the buffer sequence can comprise a numbered list of memory buffers 24(1)-24(4), arranged according to a sequence in which each of the outputs from AEs 14(1)-14(7) is written to each memory buffer, where repeated memory buffer numbers in the buffer sequence indicate buffer reuse of the corresponding memory buffers.

For example, buffers 24(1)-24(4) may be indicated by a buffer sequence {0, 1, 2, 3} representing, respectively, buffers 24(1), 24(2), 24(3) and 24(4) in that order. In another example, buffer sequence {0, 1, 2, 3, 2, 1, 2} may also represent buffers 24(1), 24(2), 24(3) and 24(4); additionally, the buffer sequence may indicate that buffers 24(3) and 24(2) may be reused (e.g., written to more than once) in the order specified in the buffer sequence. Values stored in buffers 24(3) and 24(2) may be over-written when reused.

Note that for each algorithm element (other than input and output algorithm elements), at least one input is received at the algorithm element and at least one output is generated by the algorithm element. (An input algorithm element receives inputs from a user or other signal sources (e.g., analog-to-digital converter, music player, etc.) (i.e., not another AE); an output algorithm element generates outputs that may be displayed on screen, played out on speakers (in the case of audio signals) or sent out of graphical emulator 12 (i.e., not sent out to another AE)). For example, at AE 14(2), input on connection 16(1) is received at AE 14(2) and output on connection 16(2) is generated from AE 14(2). The output can be another input to another algorithm element. For example output on connection 16(2) may be inputs to AEs 14(4) and 14(3). One connection may provide the input to the algorithm element, and another connection may accept the output from the algorithm element and provides the output as another input to another algorithm element. Thus, for any specific algorithm element, the connection providing the input is different from the connection accepting the output; the connection accepting the output can provide the output as inputs to one or more other algorithm elements. Each connection may be associated with one of memory buffers 24(1)-24(4). For example, the output on connection 16(2) may written to the memory buffer, and read as inputs by the AEs 14(4) and 14(3).

In various embodiments, the connections, the algorithm elements and the memory buffers may be numbered in an order. For each connection, a first algorithm element that generates an output on the connection before any other algorithm element may be identified. Further, for that connection, a second algorithm element that receives the output as an input on the connection after all other algorithm elements may also be identified. The first algorithm elements of all the connections may be arranged in an allocation order. As used herein, the term "allocation order" indicates an order (e.g., ascending, or descending) of the first algorithm element numbers. A buffer index may be generated according to the allocation order for each connection, where the buffer index for the connection may be the same as another buffer index for a re-use connection. A "re-use connection" is a connection whose corresponding memory buffer may be overwritten with output values of another connection. The second algorithm element of the re-use connection may be the same as the first algorithm element of the connection. In such embodiments, the buffer sequence can comprise the buffer index for all connections arranged according to the allocation order.

Processing of AEs 14(1)-14(7) may follow the connection sequence, for example, based on the availability of input signals for initiating the applicable algorithms. For example, the algorithm represented by AE 14(1) may be processed before the algorithm represented by AE 14(2), or AE 14(6), as the output signal on connection 16(1) from AE 14(1) may feed as inputs into AEs 14(2) and 14(6). Likewise, processing for AEs 14(2), 14(3), 14(4) and 14(5) may have be completed before AE 14(6) can be processed, as input signal to AE 14(6) on connection 16(5) may be obtained only after processing AE 14(3), which can be processed only after AE 14(5), which in turn can be processed only after AE 14(4), and so on. Consequently, the input signal on connection 16(1) may be retained in its corresponding buffer until processing of AE 14(6). On the other hand, the input signal on connection 16(3) is used only for processing AE 14(5). Thus, the buffer used to store the input signal on connection 16(3) may be reused after processing AE 14(5), for example, to store the output signal on connection 16(5), which serves as the input signal to AE 14(3). Reusing memory buffers may reduce the overall memory and other resource requirements, leading to increased ability to process more complicated schematics by embodiments of system 10.

In various embodiments, MLM module 20 may construct an MLM comprising a relationship between AEs 14(1)-14(7) and connections 16(1)-16(6). The MLM may indicate the sequence of writing to, and reading from, buffers 24(1)-24(4) as various AEs 14(1)-14(7) are processed by embodiments of system 10. The MLM may be manipulated to present a specific sequence of writing to, and reading from, buffers 24(1)-24(4), such that buffers 24(1)-24(4) may be re-used during the processing of AEs 14(1)-14(7), thereby reducing the memory size requirements to merely those buffers that are actively used in parallel to process AEs 14(1)-14(7).

Turning to the infrastructure of system 10, system 10 may be implemented on any suitable computing device (e.g., server, desktop computer, laptop computer, smart phone, etc.) equipped with appropriate hardware (e.g., display screen, monitor, etc.) to facilitate the operations thereof. In some embodiments, system 10 may interface with the hardware (e.g., display monitors) to perform the operations described herein. For example, graphical emulator 12 may be rendered on a display screen visible to the user, and may be associated with other hardware (e.g., mouse, joystick, touch-screen, keyboard) through which the user can manipulate schematic 13 appropriately.

In various embodiments, system 10 may be located on a single device. In other embodiments, system 10 may be distributed across multiple devices on a network, which can include any number of interconnected servers, virtual machines, switches, routers, and other nodes. Elements of FIG. 1 may be coupled to one another through one or more interfaces employing any suitable connection (wired or wireless), which provides a viable pathway for electronic communications. Additionally, any one or more of these elements may be combined or removed from the architecture based on particular configuration needs.

In some embodiments, system 10 may include applications and hardware that operate together to perform the operations described herein. For example, a portion of system 10 may be implemented in hardware, and another portion may be implemented in software, for example, as an application. As used herein, an "application" can be inclusive of an executable file comprising instructions that can be understood and processed on a computer, and may further include library modules loaded during execution, object files, system files, hardware logic, software logic, or any other executable modules.

In various embodiments, graphical emulator 12 may include other interface artifacts (such as drop down menus, windows, multiple pages, etc.) that can facilitate generating schematic 13 according to the user's needs. In various embodiments, system 10 may interface with a target device, such as a DSP, to offload a target code generated using features of system 10. Moreover, MLM module 20 shown and described herein, can also be used in a wide variety of other analytical tools, where a finite number of inputs are processed by AEs connected in a specific CS to generate a finite number of outputs.

The computing device implementing MLM module 20 may be of any suitable architecture, including DSPs and other processors. The memory management algorithms implemented by MLM module 20 may be embedded into processors, such as DSPs, as appropriate and based on particular needs. For example, the memory reuse scheme implemented by MLM module 20 may be implemented in a DSP that executes algorithms according to the target code generated by system 10. In such a DSP, memory buffers of the DSP may be reused appropriately as described herein when functional blocks (corresponding to AEs in the respective schematic) process the actual input signals and generate output signals.

In some embodiments, MLM module 20 may be implemented on a computing device (e.g., computer, smart phone, etc.) that also hosts graphical emulator 20. In such embodiments, the output generated by the computing device may be a target code that enables signal processing by a DSP according to the signal flow captured on graphical emulator 12. Details of memory buffers 24 to be used by each AE 14(1)-14(7) may be included in the target code. The computing device may determine the memory to be used by each AE 14(1)-14(7) according to MLM module 20 running on the computing device. Signal processing using the signal flow captured on graphical emulator 12 may be performed by a target DSP (which may be separate from the computing device) according to the target code generated by the computing device. Memory reuse algorithms by MLM module 20 maybe incorporated into the target code and used to optimize memory use on the target DSP.

Note that the numerical and letter designations assigned to the elements of FIG. 1 do not connote any type of hierarchy; the designations are arbitrary and have been used for purposes of teaching only. Such designations should not be construed in any way to limit their capabilities, functionalities, or applications in the potential environments that may benefit from the features of system 10. It should be understood that the architecture shown in FIG. 1 is simplified for ease of illustration.

Figure 2:
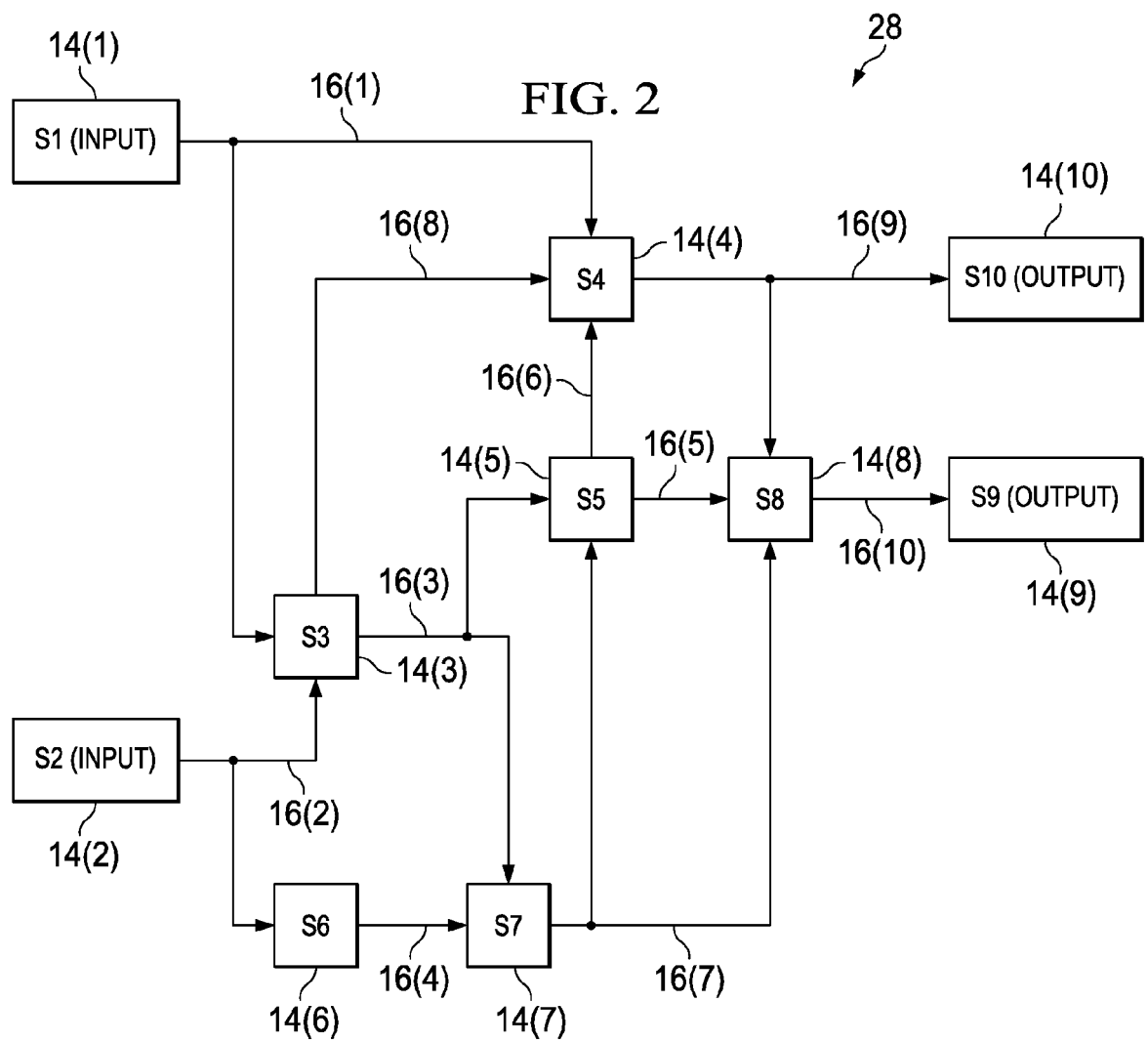
FIG. 2 is a simplified block diagram illustrating example details that may be associated with an embodiment of the system.

Turning to FIG. 2, FIG. 2 is a simplified block diagram illustrating another example schematic 28 processed in an embodiment of system 10. Example schematic 28 is used herein to explain further aspects of embodiments of system 10 in certain subsequent figures. Schematic 28 includes AEs 14(1)-14(10) connected by connections 16(1)-16(10) in a suitable CS to realize a specific SPA. The output signal from AE 14(1) over connection 16(1) may comprise inputs to AEs 14(3) and 14(4). The output signal from AE 14(2) over connection 16(2) may comprise inputs to AEs 14(3) and 14(6). AE 14(3) may thus receive two inputs, and provide three outputs: (i) over connection 16(3) to AE 14(7); (ii) over connection 16(3) to AE 14(5); and (iii) over connection 16(8) to AE 14(4). AE 14(6) may also provide an output signal over connection 16(4) to AE 14(7), which may provide outputs to AEs 14(5) and 14(8) over connection 16(7). AE 14(5) may receive inputs from AEs 14(3) and 14(7) and provide outputs to AEs 14(6) and 14(8) over connections 16(6) and 16(8), respectively. AE 14(4) may process three input signals from AEs 14(1), 14(3) and 14(5), and provide an output over connection 16(9) to AEs 14(8) and 14(10). AE 14(8) may receive three inputs (from AE 14(5), 14(7) and 14(4)) and provide an output signal over connection 16(10) to AE 14(9).

Figure 3:
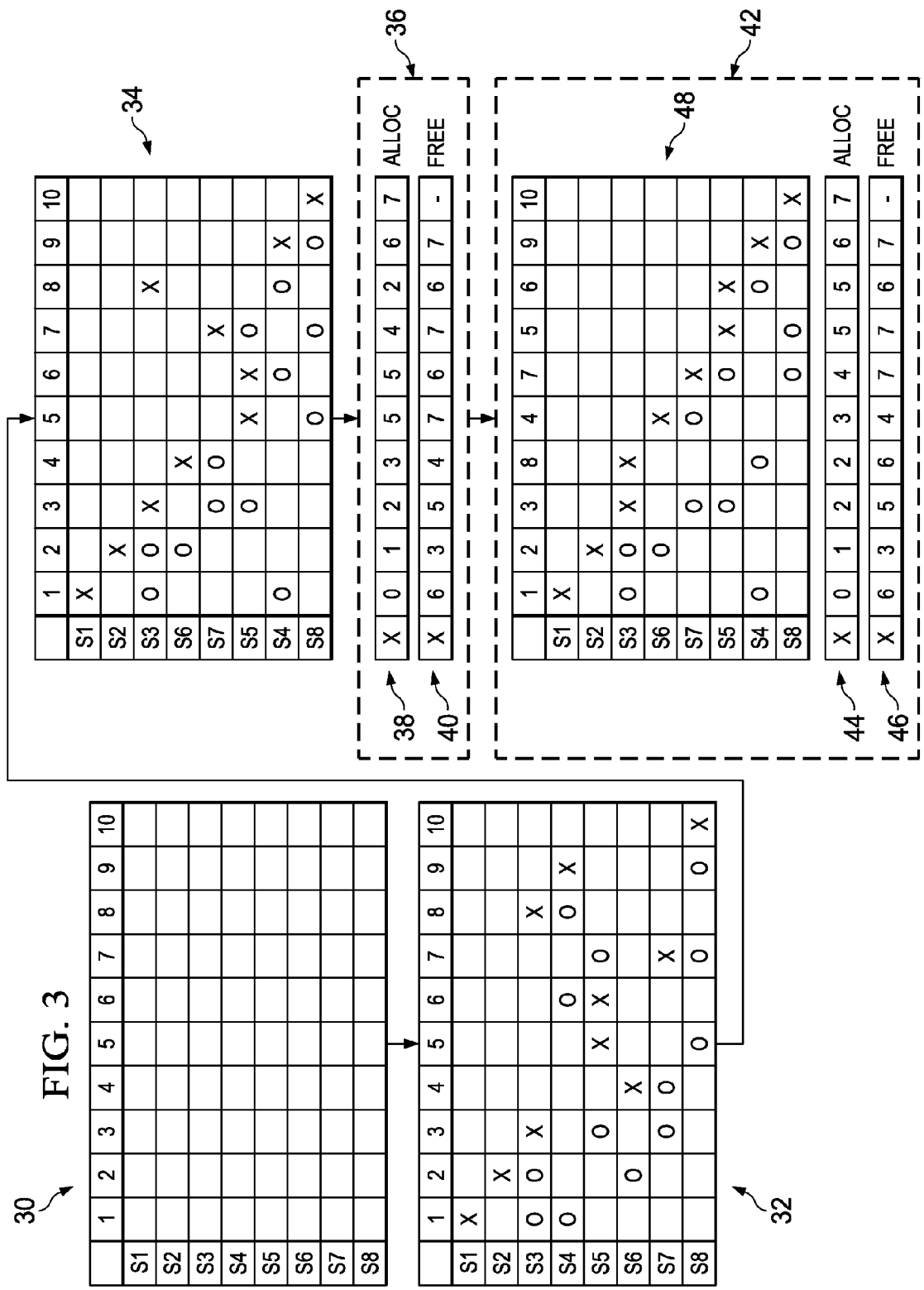
FIG. 3 is a simplified diagram illustrating other example details associated with an embodiment of the system.

Turning to FIG. 3, FIG. 3 is a simplified diagram illustrating example details of constructing an MLM matrix for schematic 28 according to embodiments of system 10. It may be noted that the example details presented herein depict an analytical (e.g., logical) approach to constructing the MLM matrix, and does not represent a physical implementation thereof. Schematic 28 comprises 10 AEs 14(1)-14(10) and 10 connections 16(1)-16(10). Output AEs 14(9) and 14(10) do not consume any buffers (e.g., as their outputs are not processed by other AEs), and can be disregarded in generating the MLM matrix. The CS of schematic 28 for purposes of buffer management may be represented as a matrix 30 including 8 rows and 10 columns corresponding to the 8 AEs 14(1)-14(8) and 10 connections 16(1)-16(10), respectively. Rows may be named according to AEs 14(1)-14(8) and columns may be named according to connections 16(1)-16(10).

Matrix 30 may be modified to matrix 32 by marking an 'x' in a cell if the corresponding connection to the corresponding AE represents an output and marking an 'o' if the corresponding connection to the corresponding AE represents an input. Thus, connection 16(1) represents an output from AE 14(1) and may be represented by an 'x' in the cell at the intersection of column 1 and row S1. Connection 16(1) also represents an input to AEs 14(3) and 14(4) and may be represented as 'o' in the cells at the intersection of column 1, and S3 and S4, respectively. Similarly, connection 16(2) represents an output from AE 14(2) and may be represented by an 'x' in the cell at the intersection of column 2 and row S2. Connection 16(2) also represents an input to AEs 14(3) and 14(6) and may be represented as 'o' in the cells at the intersection of column 2, and S3 and S6, respectively. The cells in matrix 32 may be appropriately filled according to the CS in schematic 28.

Matrix 32 may be modified to matrix 34, by changing the order of rows so that in any given column, 'x' appears above 'o'. For example, moving rows S4 and S5 to below S7 in the order {S1, S2, S3, S6, S7, S5, S4, 58}, results in matrix 34, as shown. The last 'o' in each column may be marked to be distinct from others (e.g., by coloring it a different color). Information related to MLM matrix 34 may be extracted into buffers 36, represented as an ALLOC buffer 38 and a FREE buffer 40. ALLOC buffer 38 may include the row number corresponding to entry 'x' for each column of MLM matrix 34, and FREE buffer 40 may include the highest row number corresponding to entry 'o' in each column of MLM matrix 34. Buffers 36 may be modified at 42 by rearranging the columns of ALLOC buffer 38 to ALLOC buffer 44 in an ascending order. Corresponding columns of FREE buffer 42 and MLM 34 may also be rearranged accordingly to obtain FREE buffer 46 and MLM 48, respectively.

Figure 4A:
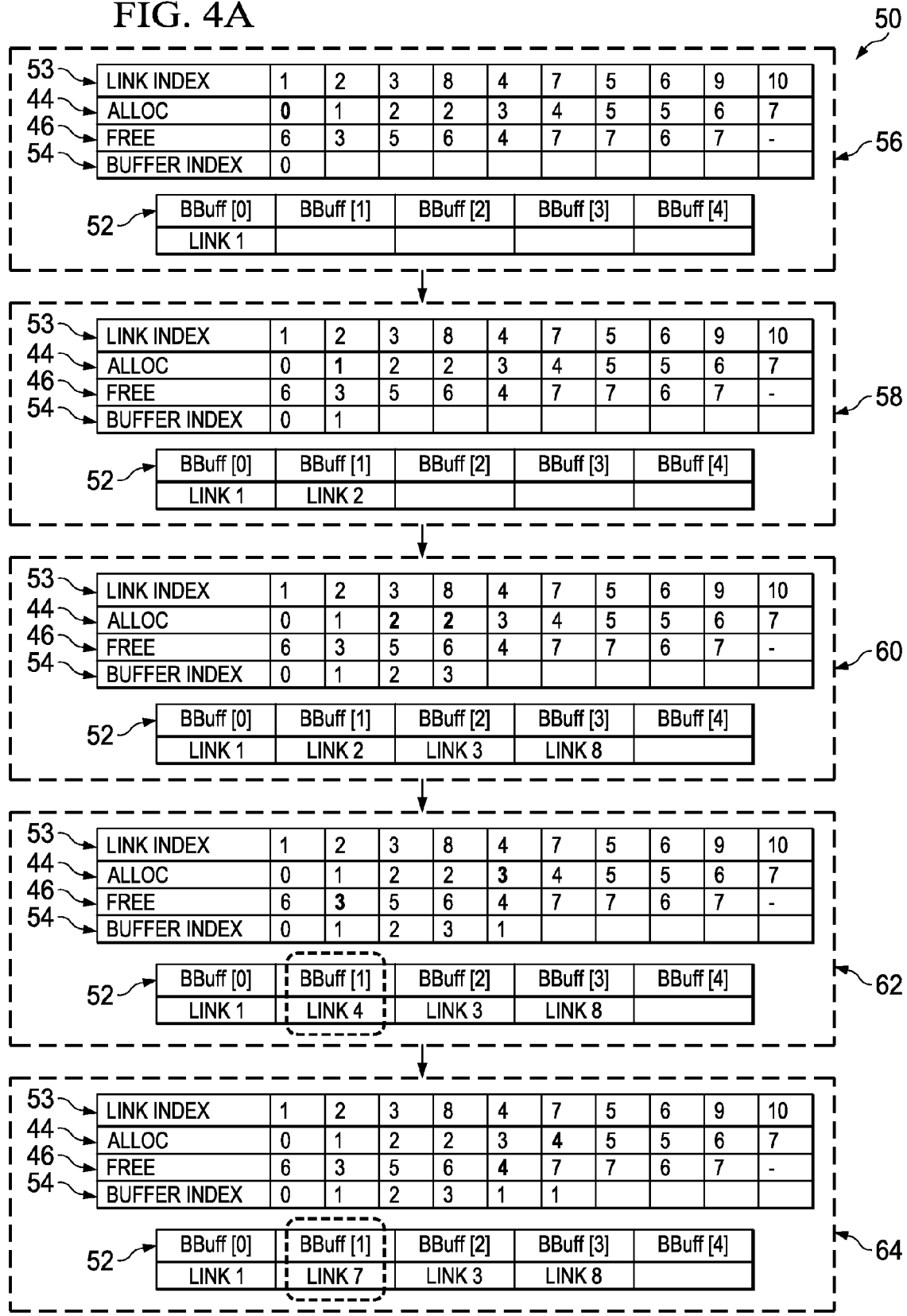
FIGS. 4A-4B are simplified diagrams illustrating yet other example details associated with an embodiment of the system.
Figure 4B:
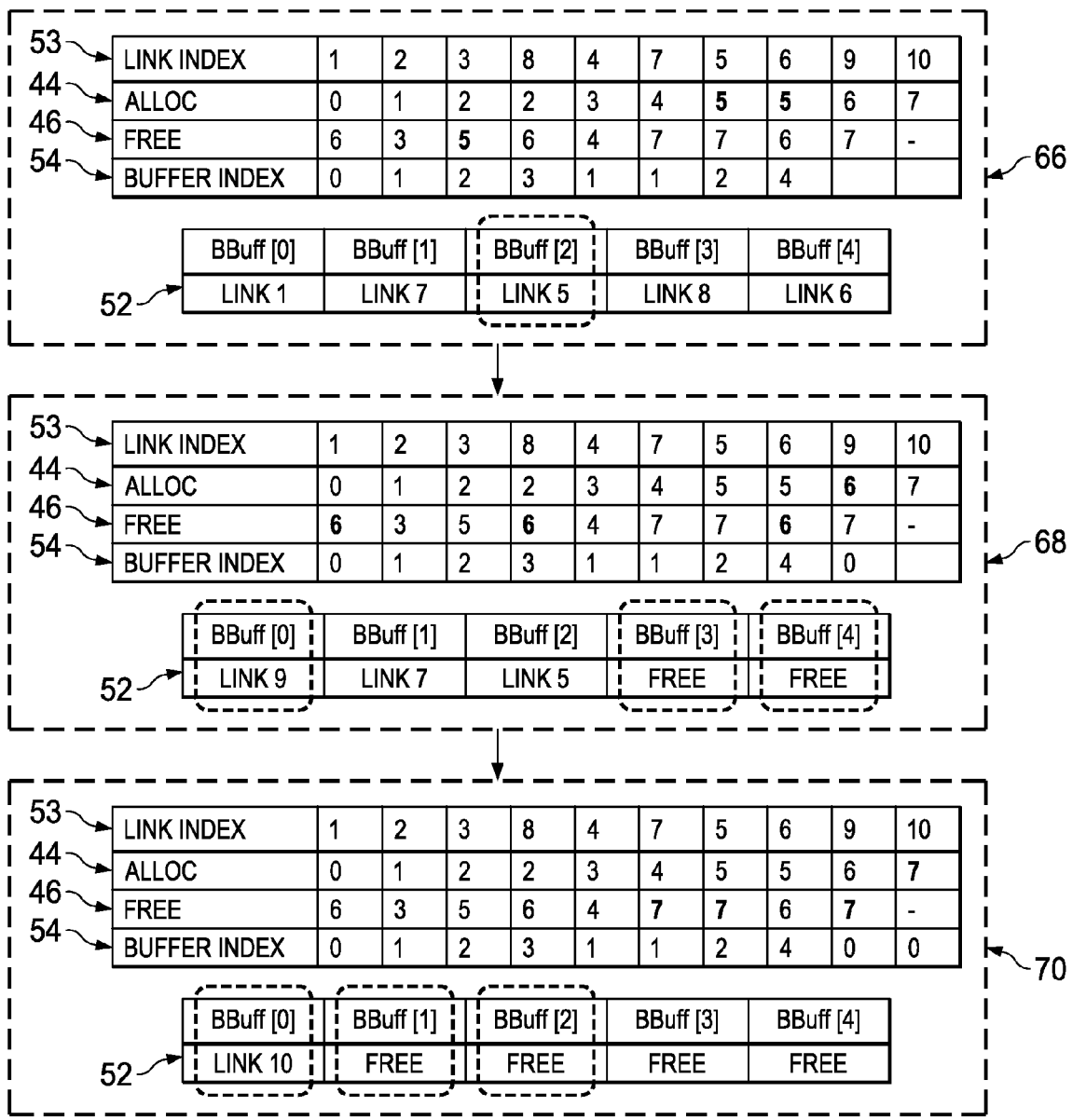

Turning to FIGS. 4A-4B, FIGS. 4A-4B are simplified diagram illustrating example details of memory reuse operations according to an embodiment of system 10. For each entry Y in ALLOC buffer 44, a buffer for each Y found in FREE buffer 46 may be freed and a buffer for each Y found in ALLOC buffer 44 may be allocated and assigned to the corresponding connection. At operation 56, a first entry (0, corresponding to AE 14(1) over connection 16(1)) in ALLOC buffer 44 may be checked. A link index 53 may present the connection corresponding to each column of ALLOC buffer 44. A buffer index 54 may indicate the location of the actual buffer, represented as table 52 in the FIGURE.

Link 1 may indicate a value of the signal over connection 16(1) of example schematic 28 of FIG. 2. Link 1 may be saved into BBuff[0], and accessed via the buffer index value of 0 in buffer index 54. At 58, the next entry (1, corresponding to AE 14(2) over connection 16(2)) in ALLOC buffer 44 may be checked. Buffer index 54 may indicate the location of the actual buffer, namely BBuff[1] where Link 2, the value of the signal over connection 16(2) of example schematic 28, may be stored. At 60, the next two entries (both having values 2, corresponding to AE 14(3) over connections 16(3) and 16(8)) in ALLOC buffer 44 may be assigned to buffers BBuff[2] and BBuff[3]. Link 3 and Link 8, corresponding to the values over connections 16(3) and 16(8), respectively, may be stored in respective buffers BBuff[2] and BBuff[3].

At 62, the next entry in ALLOC buffer 44 is 3 (corresponding to AE(6) over connection 16(4)), and the same value may be found in FREE buffer 46 corresponding to AE(6) over connection 16(2), associated with buffer index 54 having value 1. Consequently, Link 4, the value of connection 16(4), may be over-written on the preceding value in BBuff[1], and the corresponding buffer may be reused for connection 16(4) at AE(6). At 64, the next entry in ALLOC buffer is 4 (corresponding to AE(7) over connection 16(7)), and the same value may be found in FREE buffer 46 corresponding to AE 14(7)

over connection 16(4), associated with buffer index 54 having value 1. Consequently, Link 7, the value of connection 16(7), may be over-written on the preceding value in BBuff[1], and the corresponding buffer may be reused for connection 16(7) at AE(7).

At 66, the next entries (both 5, corresponding to AE 14(5) over connections 16(5) and 16(6)) in ALLOC buffer 44 may also be found in FREE buffer 46 corresponding to AE 14(5) over connection 16(3), associated with buffer index 54 having value 2. Consequently, Link 5, the value of connection 16(5), may be over-written on the preceding value in BBuff[2], and the corresponding buffer may be reused for connection 16(5) at AE(5). Because Link 5 has already been written to BBuff [2], BBuff[2] may not be reused for Link 6 simultaneously. Therefore, Link 6 may be written to BBuff[4], and buffer index 54 accordingly updated.

At 68, the next entry in ALLOC buffer 44 is 6 (corresponding to AE 14(4) over connection 16(9)), and the same value may be found in FREE buffer 46 corresponding to AE 14(4) over connections 16(1), 16(8) and 16(6), associated with buffer index 54 having values 0, 3 and 4, respectively. Consequently, Link 9, the value of connection 16(9), may be over-written on any one of the buffers, say BBuff[0], and the other available buffers may be made free (or available) for further reuse. At 70, the next entry in ALLOC buffer 47 is 7 (corresponding to AE 14(8) over connection 16(10)), and the same value may be found in FREE buffer 46 corresponding to AE 14(8) over connections 16(7), 16(5) and 16(9), associated with buffer index 54 having values 1, 2 and 0, respectively. Consequently, Link 10, the value of connection 16(10), may be over-written on any one of the buffers, say BBuff[0], and the other available buffers may be made free (or available) for further reuse. Thus, instead of using 10 buffers to store values corresponding to 10 connections 16(1)-16(10), embodiments of system 10 may use merely 4 buffers without sacrificing any performance.

Turning to FIG. 5, FIG. 5 is a simplified flow diagram illustrating example operations that may be associated with embodiments of system 10. Operations 80 include 82, at which AEs 14(1)-14(8) in a graphical simulator schematic (e.g., schematic 28) may be determined. At 84, a connection sequence between AEs 14(1)-14(8) may be determined, for example, by identifying connections 16(1)-16(10) between AEs 14(1)-14(8). At 86, an MLM (e.g., MLM 48) may be constructed. MLM 48 may include information related to AEs 14(1)-14(8) and the corresponding CS of schematic 28. At 88, the minimum amount of memory buffers with memory re-use to support algorithm execution by AEs 14(1)-14(8) may be determined. At 90, the memory buffers may be re-used accordingly.

Turning to FIG. 6, FIG. 6 is a simplified flow diagram illustrating example operations that may be associated with embodiments of system 10. Operations 100 include 102, at which processing AEs, numbering N, are identified and numbered 0 to N−1. Processing AEs include AEs whose output may be written to a memory buffer. At 104, all the M connections (CON[j], j=1 to M) in the schematic may be identified. At 106, the connections may be numbered for all AEs. At 108, the MLM may be constructed with N rows and M columns. At 110, an 'o' may be marked in each cell if the algorithm element corresponding to the row of the cell receives an input on the connection corresponding to the column of the cell. At 112, an 'x' may be marked in each cell if the algorithm element corresponding to the row of the cell receives an input on the connection corresponding to the column of the cell. At 114, rows may be rearranged such that 'x' is on the top of every column.

At 116, the row number 'i' for all columns with entry 'x' may be extracted to an ALLOC buffer for j=1 to M. At 118, the highest row number 'i' for all columns with entry 'o' is extracted into a FREE buffer for j=1 to M. At 120, columns in the MLM, FREE and ALLOC buffers may be rearranged in an allocation order indicating an ascending order of elements in the ALLOC buffer. At 122, each entry (Y) in the ALLOC buffer may be checked. A memory buffer corresponding to the connection index (i.e., link index) for each Y in the ALLOC buffer may be freed. A memory buffer for each Y in the ALLOC buffer may be allocated and assigned to the connection corresponding to the connection for Y.

Turning to FIG. 7, FIG. 7 is a simplified block diagram illustrating example details of an embodiment of system 10. In a general computing sense, overlaying includes replacing a block of stored instructions (or data) with another block. Memory overlays can provide support for applications whose entire program instructions and data do not fit in the internal memory of the processor (e.g., processor 26). Program instructions and data may be partitioned and stored in off-chip memory until they are required for program execution. The partitions are referred to as memory overlays and the routines that call and execute them as "memory overlay managers." In a general sense, overlays are a "many to one" memory mapping system. Several overlays may be stored in unique locations in off-chip memory, and they run (or execute) in a common location in on-chip memory.

MLM Module 20 may interact with an on-chip memory buffer 128, which may include an input/output (I/O) memory 130 and a state memory 132. In a general sense, I/O memory 130 may store input and output values of connections and state memory 132 may store state of AEs being processed by system 10. According to an embodiment of system 10, a portion of state memory 132 may be offloaded to an off-chip memory 134, for example, in cases where the target memory is not sufficient to store state for all AEs in the SPA. Appropriate states may be read from and written to off-chip memory 134 before and after processing AEs, respectively. In some embodiments, Read Only Memory (ROM) data (e.g., in the form of tables) may be off-loaded to off-chip memory 134 in addition to state memory 132. ROM data may not be written back to off-chip memory 134 after processing the AEs, for example, because the ROM data table may not be modified by AEs during processing. In various embodiments, a memory overlay manager 136 may facilitate overlaying off-chip memory 134 on state memory 132.

According to various embodiments, overlay manager 136 can be a user defined function responsible for insuring that a function or data within an overlay on off-chip memory 134 is in state memory 132 when the function or data is needed. The transfer of memory between on-chip state memory 132 and off-chip memory 134 can occur using direct memory access (DMA) capability of processor 26. Overlay manager 136 may also handle more advanced functionality such as checking if the requested overlay is already in run time memory, executing another function while loading an overlay, and tracking recursive overlay function calls.

In various embodiments, on-chip memory buffer 128 may be integrated with processor 26 on the same semiconductor chip and can include instruction cache, data cache, ROM, on-chip static random access memory (SRAM), and on-chip dynamic random access memory (DRAM). The instruction and data cache may be fast local memory serving an interface between processor 26 and off-chip memory 134. The on-chip SRAM may be mapped into an address space disjoint from off-chip memory 134 but connected to the same address and data buses. Both the cache and SRAM may allow fast access to their data, whereas access to off-chip memory (e.g., DRAM) 134 may require relatively longer access times. For example, accessing off-chip memory 134 may be effected by processor 26 through a suitable cache in on-chip memory 128.

Off-chip memory 134 may be used in situations with limited on-chip memory. Off-chip memory 134 can include DRAM, flash RAM, SRAM, synchronous dynamic random access memory (SDRAM), hard disk drive, and any other forms of memory elements that may be implemented outside the chip having processor 26. A portion of on-chip memory buffer 128 may be overlaid with off-chip memory 134 so that effective memory availability can be increased. DMA may be used for moving memory blocks between on-chip memory buffer 128 and off-chip memory 134 according to a sequence based on the MLM generated by MLM module 20. With DMA, processor 26 may initiate a read/write transfer, perform other operations while the transfer is in progress, and receive an interrupt from the DMA controller when the transfer is done. The memory transfer may be scheduled in the background (e.g., in parallel with other processing) so that processor wait time can be minimized.

Embodiments of system 10 may use memory requirement details and processing time requirements of the different AEs in the SPA being analyzed for placing automatic DMA requests. In some embodiments, to ensure complete background transfer, the processing time of substantially all AEs in the SPA being analyzed may be considered for placing the DMA requests; in other embodiments, the processing time of only certain AEs in the SPA may be considered for placing the DMA requests. Embodiments of system 10 may facilitate increasing effective on-chip memory availability using overlay mechanisms. Due to automatic scheduling of DMAs, memory transfer may be completed in the background, and may increase effective processing power.

Turning to FIG. 8, FIG. 8 is a simplified diagram illustrating example details of an embodiment of system 10 that uses overlay memory management. For ease of illustration, and not as a limitation, overlay memory management according to various embodiments of system 10 is explained herein with reference to schematic 13. During operation, a plurality of state buffers (e.g., stat1, stat2, stat3, etc.) may be created (e.g., in state memory 132) in state memory 132 as appropriate. A matrix 140 may be generated by MLM module 20 comprising rows corresponding to AEs 14(1)-14(8) and columns corresponding to buffers (e.g., stat1, stat2, etc.) in state memory 132 with a 'x' indicating creation of a buffer, an 'o' indicating a reading of the buffer, and an 's' indicating writing to the buffer.

Assume, merely for example purposes, that AEs 14(2) and 14(5) use off-chip memory 134. According to embodiments of system 10, an on-chip buffer (e.g., "stat5") may be created in state memory 132, and two disparate off-chip memory overlay buffers (e.g., ostat2 and ostat5 respectively) may be created in off-chip memory 134 for AEs 14(2) and 14(5). Stat5 may be used (e.g., read from or written to) first by AE (2). Subsequently, memory overlay manager 136 may post a DMA request, represented by dummy AE 142 (D1i), to save the state recorded in stat5 to ostat2 in off-chip memory 134 so that AE 14(5) can also use the same state buffer stat5. As used herein, the term "dummy AE" refers to an AE generated by MLM module 20, rather than by a user. The dummy AE's purpose includes writing to and reading from memory buffers and the associated algorithm may indicate such functions (e.g., read from memory; write to memory; etc.), rather than any specific electronic component functionality. Memory overlay manager 136 may post another DMA request to fill stat5 with values from ostat5. Meanwhile, processing of other AEs (e.g., AEs 14(3), 14(6), 14(7)) can occur substantially simultaneously as dummy AE 142 writes to memory buffer stat5 from off-chip memory ostat5 (e.g., DMA operation may be implemented in the background).

After processing of AE 14(5), the value in stat5 may be used by AE 14(5). Subsequently, memory overlay manager 136 may post yet another DMA request, represented by dummy AE 144 (D1o), to save stat5 to ostat5 in off-chip memory 134 so that AE 14(2) can also use the same state stat5 in the next processing round (if needed). Meanwhile, as these transfers are carried out (e.g., DMA operation may be implemented in the background), processing of other AEs (e.g., AEs 14(4), 14(8)) may occur simultaneously (or otherwise).

Both AE 14(2) and 14(5) may use stat5 with help of memory overlay manager 136. AE 14(2) may use an off-chip location ostat2 of size M2; AE 14(5) may use anther off-chip location ostat5 of size M5. The memory bandwidth required to transfer a memory block of size M5 may be less than the combined processing times of AEs 14(3), 14(6) and 14(7). Thus, dummy AE 142 (D1i) may be positioned (e.g., processed) to bring in stat5 buffer before AE 14(3) so that stat5 may be available for using immediately after AE 14(7). Dummy AE 144 (D1o) may be positioned to save the state back to off-chip 134 immediately after processing AE 14(5). The location of dummy AEs 142 and 144 may be based on the MLM generated by MLM module 20 for the SLA under analysis. According to the embodiment illustrated herein, the effective on-chip memory size may equal the sum of all on-chip state memory 132 and off-chip memory 134 used for processing the SLA, with a zero wait time for DMA completion.

Figure 9:
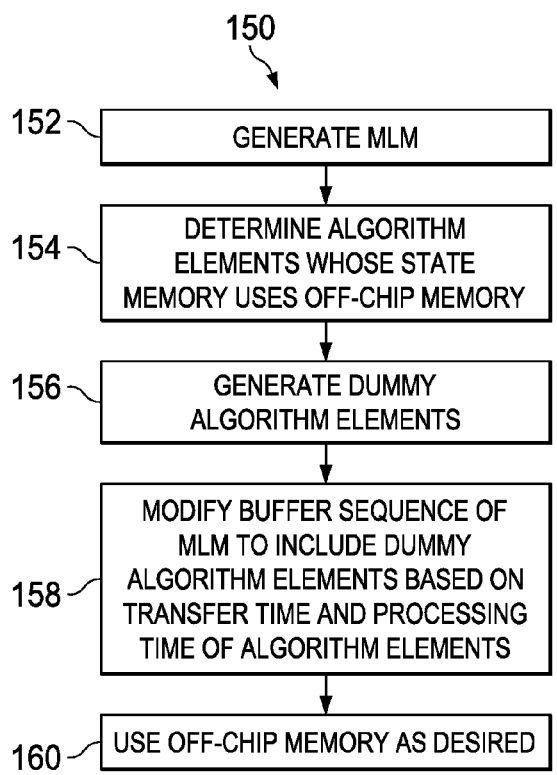
FIG. 9 is a simplified flow diagram illustrating example operations that may be associated with an embodiment of the system.

Turning to FIG. 9, FIG. 9 is a simplified flow diagram illustrating example operations 150 that may be associated with embodiments of system 10 with memory overlay management. Operations 150 may include 152, at which the MLM for the SLA under analysis may be generated by MLM module 20. At 154, AEs whose state memory uses off-chip memory 134 may be determined. At 156, dummy AEs may be generated as appropriate. For example, if a single on-chip state memory buffer is being used, two dummy AEs may be generated; if more than one on-chip state memory buffer is used, additional dummy AEs may be generated as appropriate. At 158, buffer sequence of the MLM may be modified to include the dummy AEs based on the transfer time and processing time of AEs in the SLA being analyzed.

For example, assume that AEs A, B and C are processed according to connection sequence {A,B,C}; AE C uses off-chip memory 134; transfer to and from off-chip memory 134 for AE C may be less than the processing time for AE B. On-chip state memory 132 may be generated to storing state of AE C just before processing of AE B in that case. On the other hand, if the transfer to and from off-chip memory 134 for AE C may be more than the processing time for AE B, on-chip state memory 132 may be generated for storing state of AE C before processing of AE A, and so on. At 160, off-chip memory 134 may be used as desired and based upon particular needs.

Figure 10:
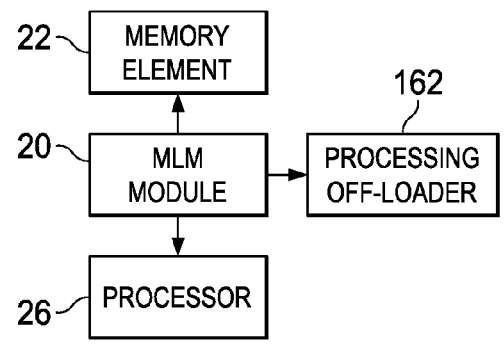
FIG. 10 is a simplified block diagram illustrating example details of the system according to the embodiment.

Turning to FIG. 10, FIG. 10 is a simplified block diagram illustrating another example embodiment of system 10 that uses processor offloading. Processing offloader 162 may include a processor, a hardware accelerator, or other processing device that can process AEs in SLAs under analysis. As used herein, the term "processing offloader" includes a processor, such as a Central Processing Unit (CPU), service processor, hardware accelerator or other processing device used in addition to (and in conjunction with) another processor. In various embodiments, processing offloader 162 may passively receive data from memory and immediately process the data; processing offloader 162 may not actively request data using memory addresses. Thus, data may be pushed to processing offloader 162, in contrast to processor 26, which may pull data using appropriate memory addresses. Moreover, when processing is offloaded to processing offloader 162, buffers have to be appropriately loaded and ready to be read by processing offloader 162 at the appropriate time.

MLM module 20 may interface with processing offloader 162, memory element 22 and processor 26. For offloading, time for transferring data across memory blocks, processing time of AEs, and the buffer sequence may be used to determine whether, and when offloading may be performed. The time for transferring data across memory blocks may depend on the size of the memory; the processing time of AEs may depend on the specific algorithm used therein; and the buffer sequence may be determined from the MLM generated by MLM module 20. Processor 26 may offload processing of certain AEs to processing offloader 162. Processor 26 may read and write registers to control the AE processing using an appropriate port. Processing offloader 162 may read data from appropriate input buffers in memory element 22 and write results to appropriate output buffers in memory element 22. Performance may be improved by pipelining algorithms appropriately using, for example, suitable DMA post modules. The algorithms may use details of available/allocated processing off-loaders 162, processing cycle requirement and data transfer overhead, among other parameters. The configuration may result in an effective processing time approximately equal to a sum of the processor MIPS and the processing offloader MIPS with a minimum increase in processor wait for DMA completion.

Figure 11:
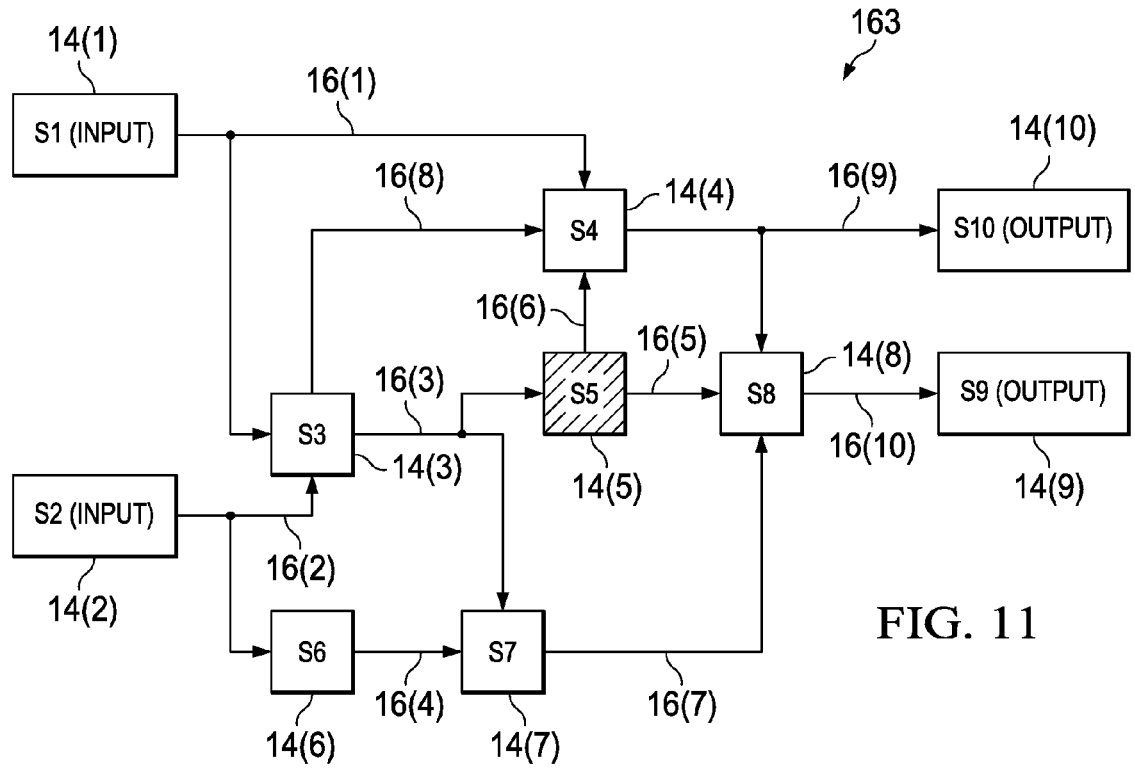
FIG. 11 is a simplified block diagram illustrating example details of an embodiment of the system.

Turning to FIG. 11, FIG. 11 is a simplified diagram illustrating another example schematic 163 for describing offloading using MLMs according to an embodiment of system 10. Assume, merely for example purposes, that AEs 14(1)-14(8), with the exception of AE 14(5), are processed by processor 26, and AE 14(5) is processed by processing offloader 162. AE 14(5) may be processed in the background, for example, as processing offloader 162 and processor 26 may run different processes (e.g., AEs) in parallel. Data may be read from memory element 22, processed, and written back to memory element 22 as appropriate. Also, AE 14(5) takes an input from AE 14(3), and generates an output each for AE 14(4) and AE 14(8). Thus, AE 14(5) may not be processed until after AE 14(3).

Turning to FIG. 12, FIG. 12 is a simplified diagram illustrating example details that may be associated with embodiments of system 10 for processor offloading as applied to schematic 163. Assume also that processing offloader 162 takes P5 MIPS to execute the task and the offloading DMA overhead is OH5. If the bandwidth for PH5 and OH5 is less than the combined processing time for AE 14(6) and AE 14(7), a dummy AE 166 (D2i) may be generated and positioned to load the buffer from an interface input buffer to processing offloader 162, such that state memory (e.g., stat5) is available for processing AE 14(5). In other words, when a memory buffer for dummy AE 166 (D2i) is created, offloading processing may be initiated. Processing of AE 14(6) and 14(7) may be performed substantially simultaneously as processing of AE 14(5).

Processing of AE 14(5) may have to be completed before the outputs from AE 14(5) are used by AEs (e.g., AE 14(4) and AE 14(8)) that are subsequently processed according to the connection sequence. Another dummy AE 168 (D2o) may be positioned to read the result buffer from processing offloader 162 to the interface output buffer of AE 14(5). Thus, output from AE 14(5) may be made available suitably to AEs 14(4) and 14(8) before they are processed according to the connection sequence. Dummy AEs 166 and 168 may be created by MLM module 20 to facilitate the operations described herein, and may not have much other functionalities apart from using memory buffers.

Turning to FIG. 13, FIG. 13 is a simplified flow diagram illustrating example operations that may be associated with embodiments of system 10 that use processor offloading. Operations 170 include 172, at which MLM may be generated by MLM module 20 for the SPA under analysis. At 174, the AEs to be processed using processing offloader 162 may be determined. At 176, dummy AEs as appropriate may be generated, based on the number of AEs to be processed by processing offloader 162. For example, for processing a single AE, two dummy AEs may be generated; for processing more than one AE, additional AEs may be generated as appropriate. At 178, buffer sequence of MLM may be modified to include the dummy AEs based on the processing time (and DMA overhead) of the AEs processed by processing offloader 162. At 180, processing offloader 162 may be used as desired.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments. Furthermore, the words "optimize," "optimization," and related terms are terms of art that refer to improvements in speed and/or efficiency of a specified outcome and do not purport to indicate that a process for achieving the specified outcome has achieved, or is capable of achieving, an "optimal" or perfectly speedy/perfectly efficient state.

The schematics (e.g., schematics 13, 28, 163) shown and described herein are merely examples, and are not limitations of any embodiment of system 10. Any number of AEs and connections may be included in the schematic within the broad scope of the embodiments. Moreover, the methods described herein may be implemented in any suitable manner on a computing device (including a DSP or other processor) comprising appropriate processors and memory elements. For example, although the MLM (e.g., MLM 48) is shown and described as an array with certain rows placed above (or below) other rows, and certain columns to the right (or left) of other columns, it may be noted that the CS indicating the buffer sequence may be expressed in any suitable arrangement including only rows, only columns, rows and columns arranged in various different patterns, etc.

In example implementations, at least some portions of the activities outlined herein may be implemented in software in, for example, MLM module 20. In some embodiments, one or more of these features may be implemented in hardware, provided external to these elements, or consolidated in any appropriate manner to achieve the intended functionality. The various elements (e.g., MLM module 20, graphical emulator 12) may include software (or reciprocating software) that can coordinate in order to achieve the operations as outlined herein. In still other embodiments, these elements may include any suitable algorithms, hardware, software, components, modules, interfaces, or objects that facilitate the operations thereof.

Furthermore, system 10 described and shown herein (and/or their associated structures) may also include suitable interfaces for receiving, transmitting, and/or otherwise communicating data or information to hardware components (e.g., computer monitors, display devices) and network devices (e.g., client devices) in a network environment. Additionally, some of the processors and memory elements associated with the various nodes may be removed, or otherwise consolidated such that a single processor and a single memory element are responsible for certain activities. In a general sense, the arrangements depicted in the FIGURES may be more logical in their representations, whereas a physical architecture may include various permutations, combinations, and/or hybrids of these elements. It is imperative to note that countless possible design configurations can be used to achieve the operational objectives outlined here. Accordingly, the associated infrastructure has a myriad of substitute arrangements, design choices, device possibilities, hardware configurations, software implementations, equipment options, etc.

In some of example embodiments, one or more memory elements (e.g., memory element 22) can store data used for the operations described herein. This includes the memory element being able to store instructions (e.g., software, logic, code, etc.) in non-transitory media, such that the instructions are executed to carry out the activities described in this Specification. A processor can execute any type of instructions associated with the data to achieve the operations detailed herein in this Specification.

In one example, processors (e.g., processor 26) could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

In operation, components in system 10 can include one or more memory elements (e.g., memory element 22) for storing information to be used in achieving operations as outlined herein. These devices may further keep information in any suitable type of non-transitory storage medium (e.g., random access memory (RAM), read only memory (ROM), field programmable gate array (FPGA), EPROM, EEPROM, etc.), software, hardware, or in any other suitable component, device, element, or object where appropriate and based on particular needs. The information being tracked, sent, received, or stored in system 10 could be provided in any database, register, table, cache, queue, control list, or storage structure, based on particular needs and implementations, all of which could be referenced in any suitable timeframe. Any of the memory items discussed herein should be construed as being encompassed within the broad term 'memory element.' Similarly, any of the potential processing elements, modules, and machines described in this Specification should be construed as being encompassed within the broad term 'processor.'

It is also important to note that the operations and steps described with reference to the preceding FIGURES illustrate only some of the possible scenarios that may be executed by, or within, the system. Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method, comprising:
   determining a connection sequence of a plurality of algorithm elements in a schematic of a signal flow for an electronic circuit, wherein the connection sequence indicates connections between the algorithm elements and a sequence of processing the algorithm elements according to the connections;
   determining a buffer sequence indicating an order of using a plurality of memory buffers to process the plurality of algorithm elements according to the connection sequence; and
   reusing at least some of the plurality of memory buffers according to the buffer sequence, wherein the determining the buffer sequence comprises:
      constructing a first memory life matrix (MLM) comprising N rows and M columns, wherein N is the number of the algorithm elements using the memory buffers, and M is the number of the connections;
      arranging the N algorithm elements in an ascending order in the N rows and the M connections in an ascending order in the M columns;
      for each cell in the first MLM, marking a first symbol if the algorithm element corresponding to the row of the cell generates an output on the connection corresponding to the column of the cell, and marking a second symbol if the algorithm element corresponding to the row of the cell receives an input on the connection corresponding to the column of the cell; and
      generating a second MLM by rearranging the rows in the first MLM such that in any given column, the first symbol appears before the second symbol.

2. The method of claim 1, wherein for each algorithm element, at least one input is received at the algorithm element and at least one output is generated by the algorithm element, wherein the at least one output can be another input to at least one other algorithm element, wherein one connection provides the input to the algorithm element, and another connection accepts the output from the algorithm element and provides the output as the another input to the at least one other algorithm element, and wherein each connection is associated with one of the memory buffers, wherein the output on the another connection is written to the memory buffer, and read as the another input by the at least one other algorithm element.

3. The method of claim 2, wherein the buffer sequence comprises a numbered list of the memory buffers, arranged according to a sequence in which each of the outputs from the algorithm elements is written to each memory buffer, wherein repeated memory buffer numbers in the buffer sequence indicate buffer reuse of the corresponding memory buffers.

4. The method of claim 1, wherein determining the buffer sequence comprises:
numbering the connections, the algorithm elements and the memory buffers in an order;
for each connection, identifying a first algorithm element that generates an output on the connection before any other algorithm element, and identifying a second algorithm element that receives the output as an input on the connection after all other algorithm elements;
arranging the first algorithm elements of all the connections in an allocation order, wherein the allocation order comprises an ascending order of first algorithm element numbers; and
generating, according to the allocation order, a buffer index for each connection, wherein the buffer index for the connection is the same as another buffer index for a re-use connection, wherein the second algorithm element of the re-use connection is the same as the first algorithm element of the connection, and wherein the buffer sequence comprises the buffer index for all connections arranged according to the allocation order.

5. The method of claim 1, wherein each row is named according to the number of the corresponding algorithm element, and each column is named according to the number of the corresponding connection.

6. The method of claim 5, further comprising:
generating a first allocation list comprising one row and M columns corresponding to the M columns of the MLM, wherein each cell in the allocation list comprises the row number corresponding to the column of the second MLM having the first symbol;
generating a second allocation list by rearranging the M columns of the first allocation list according to an allocation order comprising an ascending order of the row numbers in the first allocation list;
generating a first free list comprising one row and M columns corresponding to the M columns of the MLM, wherein each cell in the free list comprises the highest row number corresponding to the column of the second MLM having the second symbol; and
generating a second free list by rearranging the M columns of the first free list according to the allocation order.

7. The method of claim 6, further comprising:
for each entry in the second allocation list, determining if the entry is found in the second free list;
identifying connection numbers corresponding to the entry in the second free list;
freeing the memory buffers corresponding to the identified connections; and
allocating at least one of the freed memory buffers to another connection corresponding to the entry in the second allocation list.

8. The method of claim 1, wherein determining the connection sequence comprises:

identifying connections that provide inputs to some algorithm elements;
identifying connections that accept outputs from some other algorithm elements; and
determining an order in which the inputs are received and outputs are generated at the algorithm elements.

9. The method of claim 1, wherein the schematic is generated using a graphical simulator on a computing device.

10. The method of claim 1, wherein each algorithm element represents an emulation of a functional component of the electronic circuit, configured to process one or more inputs according to a predefined algorithm to generate one or more outputs.

11. Logic encoded in non-transitory media that includes instructions for execution and when executed by a processor, is operable to perform operations comprising:
determining a connection sequence of a plurality of algorithm elements in a schematic of a signal flow for an electronic circuit, wherein the connection sequence indicates connections between the algorithm elements and a sequence of processing the algorithm elements according to the connections;
determining a buffer sequence indicating an order of using a plurality of memory buffers to process the plurality of algorithm elements according to the connection sequence; and reusing at least some of the plurality of memory buffers according to the buffer sequence, wherein the determining the buffer sequence comprises:
constructing a first MLM comprising N rows and M columns, wherein N is the number of the algorithm elements using the memory buffers, and M is the number of the connections;
arranging the N algorithm elements in an ascending order in the N rows and the M connections in an ascending order in the M columns;
for each cell in the first MLM, marking a first symbol if the algorithm element corresponding to the row of the cell generates an output on the connection corresponding to the column of the cell, and marking a second symbol if the algorithm element corresponding to the row of the cell receives an input on the connection corresponding to the column of the cell; and
generating a second MLM by rearranging the rows in the first MLM such that in any given column, the first symbol appears before the second symbol.

12. The logic of claim 11, wherein determining the buffer sequence comprises:
numbering the connections, the algorithm elements and the memory buffers in an order;
for each connection, identifying a first algorithm element that generates an output on the connection before any other algorithm element, and identifying a second algorithm element that receives the output as an input on the connection after all other algorithm elements;
arranging the first algorithm elements of all the connections in an allocation order, wherein the allocation order comprises an ascending order of first algorithm element numbers; and
generating, according to the allocation order, a buffer index for each connection, wherein the buffer index for the connection is the same as another buffer index for a re-use connection, wherein the second algorithm element of the re-use connection is the same as the first algorithm element of the connection, and wherein the buffer sequence comprises the buffer index for all connections arranged according to the allocation order.

13. The logic of claim 11, wherein each row is named according to the number of the corresponding algorithm element, and each column is named according to the number of the corresponding connection.

14. The logic of claim 13, wherein the determining the buffer sequence further comprises:
generating a first allocation list comprising one row and M columns corresponding to the M columns of the MLM, wherein each cell in the allocation list comprises the row number corresponding to the column of the second MLM having the first symbol;
generating a second allocation list by rearranging the M columns of the first allocation list according to an allocation order comprising an ascending order of the row numbers in the first allocation list;
generating a first free list comprising one row and M columns corresponding to the M columns of the MLM, wherein each cell in the free list comprises the highest row number corresponding to the column of the second MLM having the second symbol; and
generating a second free list by rearranging the M columns of the first free list according to the allocation order.

15. The logic of claim 14, wherein the determining the buffer sequence further comprises:
for each entry in the second allocation list, determining if the entry is found in the second free list;
identifying connection numbers corresponding to the entry in the second free list; freeing the memory buffers corresponding to the identified connections; and allocating at least one of the freed memory buffers to another connection corresponding to the entry in the second allocation list.

16. An apparatus, comprising:
a memory element for storing data, wherein the memory element comprises a plurality of memory buffers; and
a processor operable to execute instructions associated with the data, wherein the processor and the memory element cooperate, such that the apparatus is configured for:
determining a connection sequence of a plurality of algorithm elements in a schematic of a signal flow for an electronic circuit, wherein the connection sequence indicates connections between the algorithm elements and a sequence of processing the algorithm elements according to the connections;
determining a buffer sequence indicating an order of using the plurality of memory buffers to process the plurality of algorithm elements according to the connection sequence; and
reusing at least some of the plurality of memory buffers according to the buffer sequence, wherein the determining the buffer sequence comprises:
constructing a first MLM comprising N rows and M columns, wherein N is the number of the algorithm elements using the memory buffers, and M is the number of the connections;
arranging the N algorithm elements in an ascending order in the N rows and the M connections in an ascending order in the M columns;
for each cell in the first MLM, marking a first symbol if the algorithm element corresponding to the row of the cell generates an output on the connection corresponding to the column of the cell, and marking a second symbol if the algorithm element corresponding to the row of the cell receives an input on the connection corresponding to the column of the cell; and
generating a second MLM by rearranging the rows in the first MLM such that in any given column, the first symbol appears before the second symbol.

17. The apparatus of claim 16, wherein determining the buffer sequence comprises:
numbering the connections, the algorithm elements and the memory buffers in an order;
for each connection, identifying a first algorithm element that generates an output on the connection before any other algorithm element, and identifying a second algorithm element that receives the output as an input on the connection after all other algorithm elements;
arranging the first algorithm elements of all the connections in an allocation order, wherein the allocation order comprises an ascending order of first algorithm element numbers; and
generating, according to the allocation order, a buffer index for each connection, wherein the buffer index for the connection is the same as another buffer index for a re-use connection, wherein the second algorithm element of the re-use connection is the same as the first algorithm element of the connection, and wherein the buffer sequence comprises the buffer index for all connections arranged according to the allocation order.

18. The apparatus of claim 16, wherein each row is named according to the number of the corresponding algorithm element, and each column is named according to the number of the corresponding connection.

19. The apparatus of claim 18, wherein the determining the buffer sequence further comprises:
generating a first allocation list comprising one row and M columns corresponding to the M columns of the MLM, wherein each cell in the allocation list comprises the row number corresponding to the column of the second MLM having the first symbol;
generating a second allocation list by rearranging the M columns of the first allocation list according to an allocation order comprising an ascending order of the row numbers in the first allocation list;
generating a first free list comprising one row and M columns corresponding to the M columns of the MLM, wherein each cell in the free list comprises the highest row number corresponding to the column of the second MLM having the second symbol; and
generating a second free list by rearranging the M columns of the first free list according to the allocation order.

20. The apparatus of claim 19, wherein the determining the buffer sequence further comprises:
for each entry in the second allocation list, determining if the entry is found in the second free list;
identifying connection numbers corresponding to the entry in the second free list; freeing the memory buffers corresponding to the identified connections; and allocating at least one of the freed memory buffers to another connection corresponding to the entry in the second allocation list.

* * * * *